United States Patent [19]

Fricke

[11] Patent Number: 4,688,110

[45] Date of Patent: Aug. 18, 1987

[54] METHOD AND APPARATUS FOR RECORDING A VIDEO SIGNAL WITHOUT LOSS OF A SOUND SIGNAL RECORDED ON THE SAME TRACKS

[75] Inventor: Walter Fricke, Wesseln, Fed. Rep. of Germany

[73] Assignee: Blaupunkt-Werke GmbH, Hildesheim, Fed. Rep. of Germany

[21] Appl. No.: 740,558

[22] Filed: Jun. 3, 1985

[30] Foreign Application Priority Data

Jun. 7, 1984 [DE] Fed. Rep. of Germany ....... 3421197

[51] Int. Cl.$^4$ .............................................. G11B 5/782
[52] U.S. Cl. .................................... 360/19.1; 360/60; 358/343
[58] Field of Search ................. 360/60, 31, 19.1, 14.1, 360/33.1, 14.2, 73, 20; 358/343, 341, 335

[56] References Cited

U.S. PATENT DOCUMENTS 4,303,950 12/1981 Taniguchi .......................... 360/19.1
4,390,906  6/1983 Fummoto .......................... 360/19.1
4,527,202  7/1985 Ohta .................................. 360/19.1

FOREIGN PATENT DOCUMENTS 48514  4/1979 Japan ..................................... 360/60

OTHER PUBLICATIONS

R. Frank, HiFi Sound for Video Recorders, Funk-Technik, v. 38, pp. 498–499, 1983.

Primary Examiner—Alan Faber
Attorney, Agent, or Firm—Frishauf, Holtz, Goodman & Woodward

[57] ABSTRACT

The tape of a video cassette providing oblique recording tracks of a longitudinal sound track for relatively narrow-band sound and a control track for vertical scan frequency synchronizing signals, instead of being usable alternately either for recording stereo and other wide-band sound on the oblique tracks and for recording television signals with sound either on the oblique tracks or on the longitudinal sound track, can be used for noninterfering superposed recording of sound on the oblique tracks using the usual FM sound signal carriers and a full television signal with the related sound on the longitudinal track. This is possible because by first recording the sound program on the oblique tracks, a greater depth of penetration of magnetization of the magnetic tape is produced than takes place with the recording of video signals. In consequence, when a sound program has been recorded on the oblique tracks of a video tape, and it is desired to record a television program on the same tape without losing the sound program, the video recorder, upon sensing a presence of the sound program already there, is caused to disable its erase heads for the synchronizing and oblique tracks, to control the tape advance from the synchronizing signals already on the synchronizing track and to record the sound of the television signal on the longitudinal track. The video signal with its low depth of penetration in the magnetic record leaves the underlying sound recording available for playback independently of the television signal.

7 Claims, 5 Drawing Figures

METHOD AND APPARATUS FOR RECORDING A VIDEO SIGNAL WITHOUT LOSS OF A SOUND SIGNAL RECORDED ON THE SAME TRACKS

The invention concerns a method of recording a television signal with a so-called Hi Fi video recorder which is equipped not only with magnetic heads for recording and reproducing video signals, a control track head for recording and reproducing synchronizing signals and a longitudinal track sound head, but also with oblique track sound heads for high quality sound recording and reproduction, as well as a full track erase head and a video signal detector connected to the video heads. The invention also concerns a video recorder/playback apparatus for performance of the method of the invention.

In video recorder/playback equipment, commonly referred to as video recorders for short, recently in common use, the video signal itself is recorded in an oblique track method by means of special video heads, whereas the sound head operating with a longitudinal track on the same tape is provided for the corresponding audio-frequency sound signal in order to record the sound signal on a longitudinal linear track of the video tape in just the same manner as sound is recorded on a audio tape by conventional audio tape recorders.

Whereas the oblique track method permits working with high frequencies, even at the relatively low tape velocity of the video tape of a video cassette, the recording and reproduction of the relatively low-frequency sound signals by way of the longitudinal tape track does not meet the increased requirements and standards that are common to a high fidelity (Hi Fi) sound system, because of the low tape velocity in video tape machines As a result, in the newer video recorders, commonly called Hi Fi video recorders, even the audio-frequency sound is recorded by the oblique track method, so that the sound quality may be substantially improved and the Hi Fi standards are readily maintained. Furthermore, it is then likewise possible to work with two sound channels, so that stereo recordings of high-quality can be obtained which is a significant feature of the already introduced stereo television with stereo sound.

In the above-mentioned Hi Fi video recorders, two FM sound carriers are modulated with the signals of the audio-frequency stereo sound channels and, accordingly, two FM sound heads are provided in addition to the video heads for the oblique tracks.

Even though in the practice just described the longitudinal track is no longer needed for sound recording, the Hi Fi video recorder nevertheless is still provided with a sound head for a longitudinal track. This is important for reasons of compatibility, in order to be able to play back on the Hi Fi video recorders even video cassettes in which the sound signals are still to be found on a longitudinal track, having been recorded with older or monophonic video recorders.

Hi Fi video recorders accordingly possess an FM sound carrier detector in order to be able to recognize at the beginning of playback of a video cassette, whether the sound was recorded in the new recording system or whether the sound is still contained in a longitudinal track. When the FM carrier detector recognizes the presence of an FM sound carrier, the sound signals on that carrier are demodulated and amplified, whereas otherwise the sound amplifier is switched over to the head that picks up a signal from the longitudinal track.

In the newer Hi Fi video recorders, moreover, the sound is not only recorded in the oblique tracks, but also alongside in at least one longitudinal track in what is still the usual way so that, conversely, a video tape on which a recording has been made with a Hi Fi video recorder can still be played back also on a video recorder of older design.

Since the sound quality obtainable with Hi Fi video recorders is so outstanding, the equipment manufacturers even provide for external audio-frequency connections making it possible to utilize a video cassette or other video tape exclusively for sound recording and reproduction in place of a conventional tape recording of sound. This supplementary utility, however, has been subject to disadvantages for those desiring to use it.

The first and principal difficulty is that a video cassette once used exclusively for recording of sound can no longer be used for recording of a television signal without loss of the sound recording, because in television recording the recorded sound would be erased. The consumer therefore requires an increased number of video cassettes, among which those used exclusively for the playback of sound are to be regarded as inefficiently used, because their capability for recording video signals is not utilized.

SUMMARY OF THE INVENTION

It is an object of the present invention to provide a more economical utilization of video cassettes extending over their range of applicability, making it possible to record video signals and a corresponding "lo-fi" sound channel, in addition to hi-fi sound, on the same video cassette tape, and to provide a video recorder for carrying out such a method Briefly, when the video signal detector finds no video signals in the preliminary playback operation preceding recording, the full track erase head and also the oblique track sound heads are removed from operation in the succeeding recording operation, and the control track head is maintained in the operation it normally has in playback, all this at least if some trace of sound recording is detected at the same time there is an absence of the video signals.

By means of the invention, it is possible for the first time to record an audio-frequency signal —preferably a Hi Fi stereo signal—on oblique tracks of a video tape and then later to use the same tape for recording a television signal with the same video recorder without loss of the audio-frequency record. This means that a video cassette which already has a Hi Fi stereo recording on it, which the owner wants to be able to continue to play, can nevertheless be used as an ordinary video cassette for the recording of a television signal without erasing the sound signal present on the oblique tracks of the video tape. What's more, in that case the longitudinal track is still available for the sound accompanying the television recording, and the automatic transfer of the television sound to the longitudinal track is accordingly an additional useful adjunct of the present invention.

In contrast with the known recording processes, the invention has the advantage of making possiblity a double-utilization of video cassettes on which there has been recorded, along with a previously recorded Hi Fi sound signal, a subsequently recorded television signal including the sound relating thereto. In playback of such a video cassette, the user can then select whether he wants to play back the recorded television transmission or the recorded low-frequency stereo sound program. Along with this double-use of the cassettes, of course, there is a substantial economic advantage, since it is possible to record all of both kinds of signals that a user wants on a smaller number of cassettes.

The invention is based on the recognition that in spite of the presence of FM sound carriers for stereo sound recorded in the oblique tracks of a video tape, it is still possible to record a video signal on the same oblique tracks without loss of the earlier-recorded sound signal, simply by avoiding the erasure of the sound signal. This result is due to the different penetration depth of the two recordings in the magnetization of the magnetic layer of the video tape. This penetration depth, in addition to depending upon the recording current, also depends significantly on the frequency of the signals to be recorded, the penetration depth becoming smaller with increasing signal frequency.

The penetration depth of the FM sound carrier is therefore relatively great, in contrast to the video signals which, on account of their higher frequency, have only a relatively slight penetration depth. For this reason and especially with the contribution of different azimuth angles provided in the recorder for the FM audio heads and the video heads respectively, a video signal can still be recorded usefully on a tape on which an FM sound signal has already been recorded which the owner of the tape does not want to lose.

An important feature of the invention is that the control track of the video tape is used for synchronous tape advance during the later recording of a video signal, since synchronization signals would already be there from the earlier recording of sound, and this is done even though the video recorder is operated in a recording mode in which heretofore new synchronization signals were recorded.

As is known, a video recorder must assure the correct positioning of the picture tracks in recording and the correct tracking of the video heads on the record in playback. For this purpose, synchronization is generally provided by vertical scanning frequency pulses which are used to affect the motion of the headwheel for the video heads so that the video head passes a tape gap at the brief interval between successive picture fields. This means, in other words, that tape gaps fall exactly in the blanking interval of the television picture. At the same time, the tape transport—i.e., the capstan motor—is also synchronized by the vertical pulses and the vertical pulse during recording is normally recorded in the control track of the video tape as a control signal.

The position of the synchronizing pulses or control signals therefore possesses, after recording, a fixed mechanical relation to the video tracks (oblique tracks). This relation is unchangeable after the termination of recording and can therefore be compared to the perforations provided in photographic motion picture film. The recording of control signals on the control track is therefore also known as "magnetic perforation". In reproduction the control signals are picked up by the control track head in order to synchronize the tape advance.

In the practice of the invention, in contrast to the usual synchronizing practice just described, there is provided a "reduced recording" mode of operation of the video recorder in which the control track is read by the control track head to synchronize the tape advance whenever a video tape on which audio-frequency stereo signals have already been recorded and it is desired to add the recording of a television signal. Control signals are in such a case already on the control track, having been recorded during the recording of the stereo signals.

In the electronic editing of television pictures, particularly in the "insert mode" (replacing part of an old recording with new recording), it is already known to use the control signals already on the control track for synchronizing the new recording replacing a portion of the old recording, but in this case the old video signal is simply overwritten with the new video signal, in fact with an appreciably amplified level, so that the old video signal is suppressed and only the new video signal will be visible in playback.

In contrast to the procedure just described, the audio frequency stereo signal previously recorded is retained in the process of the invention when a video signal is recorded on top of it. Both the sound signal and the later recorded video signal remain available for playback after the video recording.

For carrying out the method of the invention, a video recorder has a mode transfer switch for activation at the beginning of each recording, by which the video recorder can be switched not only into a playback mode or a recording mode, but also into a "reduced recording" mode, and the mode switch is made to be controllable by an identification circuit for evaluating the state of the video tape.

In such a recorder, when the recording mode is initially switched in manually by the user, a mode transfer is imposed immediately thereafter by which the mode switch first goes into the playback mode in order to be able to identify the state of the video tape. If the tape is an unused video cassette empty of all recording, the control circuit responsive to identification in the state of the tape operates the mode switch to restore the recording mode, and a television transmission is recorded thereafter in the usual way, with the television sound therefore being likewise recorded in the oblique track method.

If, on the contrary, the identification shows that there is already an audio-frequency sound signal recorded in the oblique track manner on the video tape and that no television signal is there, in the following recording of a television signal the television sound is caused to be recorded on the longitudinal track and the circuit for erasing the oblique tracks is put out of action (this is the reduced recording mode operation).

BRIEF DESCRIPTION OF THE DRAWINGS

The invention is further described by way of illustrative example with reference to the annexed drawings, in which.

TECHNICAL BACKGROUND

Disposition of Recording Tracks and Frequency Distribution of Signals

Figure 1:
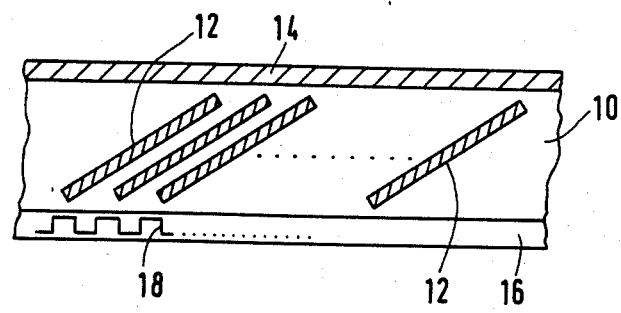
FIG. 1 is a schematic representation of a short length of video tape.
Figure 2:
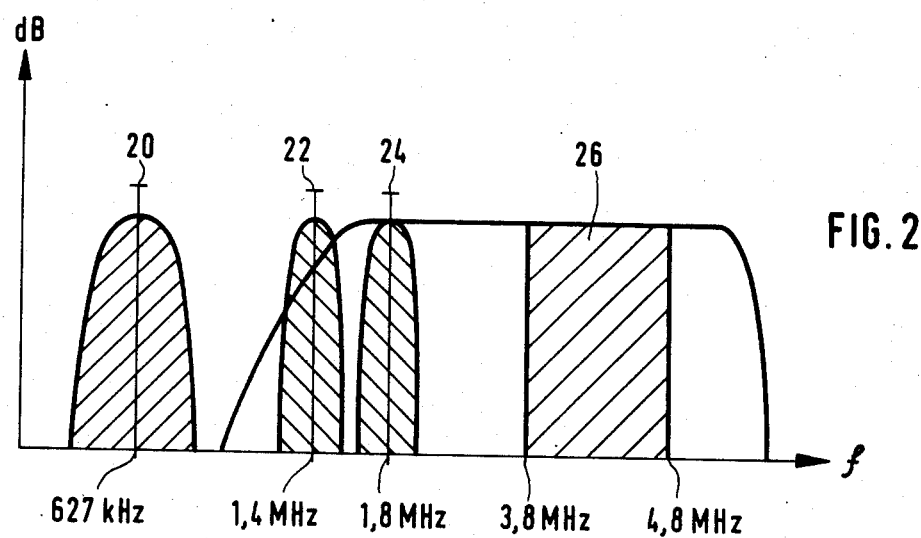
FIG. 2 is a frequency spectrum diagram relating to a recording on video tape.

Reference is first made to FIG. 1 showing how recording tracks are arranged on video tape capable of recording two channels of Hi Fi sound along with a picture channel, and FIG. 2 which shows the distribution of frequencies in the recording of signals on the tape of FIG. 1

In the ordinary video recorders commonly used today, the video signal is recorded on the oblique tracks 12 by means of the video heads while the audio frequency sound signal contained in the composite television signal which is to be recorded is recorded in the longitudinal track 14 at the edge of the tape.

In the newer Hi Fi video recorders already in use, on the other hand, the sound recording, as well as the video recording, is done in the oblique tracks and, as can be seen from FIG. 2, two FM sound carriers 22 and 24 are provided for the stereo sound channels.

In stereo recording, the FM carrier at 1.4 MHz serves for recording of the left stereo channel and the FM carrier at 1.8 MHz is used for recording the right stereo channel. The television luminance signal 26 swings around in the region between 3.8 MHz and 4.8 MHz, while the color carrier 20 is at 627 kHz.

The newer kind of Hi Fi video recorder, for which the frequency spectrum of FIG. 2 holds, in which it is possible to do the sound recording by the oblique track method with the two FM sound carriers 22 and 24, by use of two FM sound heads, is the starting point of the development of the present invention. It is to be noted in this connection that these new Hi Fi video recorders are also equipped with the conventional longitudinal track sound head, for reasons of compatibility, so that with them it is also possible to play a video cassette in which the sound has been recorded on the longitudinal track 14 shown in FIG. 1.

It is also to be noted that tape 10 shown in FIG. 1 has a control track 16 in addition to the longitudinal track 14 and the oblique tracks 12. In recording, the vertical pulses are recorded as control signals 18 for synchronization purposes in order to obtain what has previously been described as "magnetic perforation". The control signals 18 are recorded on the control track 16, even when the video tape 10 being used exclusively for recording sound signals on the oblique tracks. The presence of control signals 18 on the control track 16 can therefore be used for recognizing whether the tape 10 has already been recorded on.

The new Hi Fi video recorders, moreover, are equipped with an FM sound carrier detector in order to recognize whether on a tape which has been inserted into the machine the sound signal of a television recording has been recorded on the oblique tracks or on the longitudinal track 14, in order to activate, in the playback mode, the FM sound heads in the first case or the longitudinal track sound head in the second case. As further described below, this FM sound carrier detector can be utilized in connection with the present invention, as can also the control signals 18 for recognizing or identifying the state of the video tape for the benefit of following operations.

As already mentioned above, the invention makes it possible to record a television signal supplementarily when a sound recording has already been made on the oblique tracks of the tape, in which case the sound signals contained in the composite television signal are recorded on the longitudinal track 14 and the video signal is recorded on the oblique tracks in the usual way without any resulting loss of the previously recorded sound signals.

DESCRIPTION OF THE ILLUSTRATED EMBODIMENT

For making clear the type of operation just mentioned above, reference is now made to FIG. 3 which diagrammatically shows a section of a video tape 10 perpendicular to the tape and running along the length of an oblique track 12. The tape 10 has an underlying carrier substrate material 30 with an overlying magnetic layer 28. The wavy line 32 represents a sound carrier recorded in the oblique track method, while the wavy line 34 represents a recorded video signal.

In the magnetizing operation of recording, there is a penetration depth of magnetization dependent upon the signal to be recorded, which depth in the magnetic layer 28 decreases with increasing signal frequency. Since the frequency of the FM sound carrier 32 is relatively low compared to the frequency of the video signal 34, there is a greater penetration depth of the signal 32.

Figure 3:
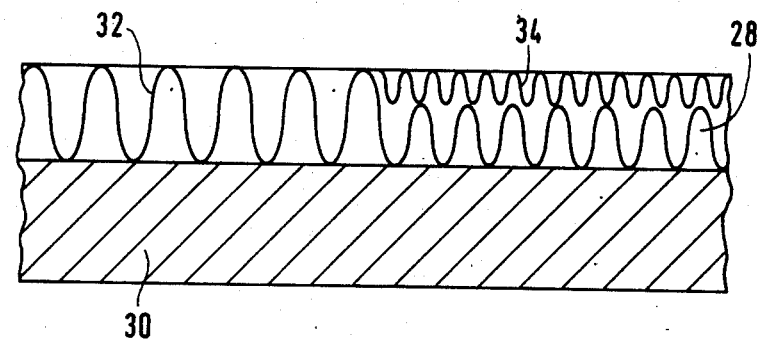
FIG. 3 is a diagrammatic representation of recording in an oblique track on magnetic tape in accordance with the invention, shown as a longitudinal section of such a track on the tape.

In the righthand portion of FIG. 3, it is shown how relatively small the penetration depth of the video signal 4 recorded in a second recording operation on the video tape 10. The sound carrier 32 already present is indeed somewhat "smashed", as the result of the subsequent recording of the video signal 34, but the sound carrier 32 nevertheless is preserved so that it can be reproduced.

Figure 4:
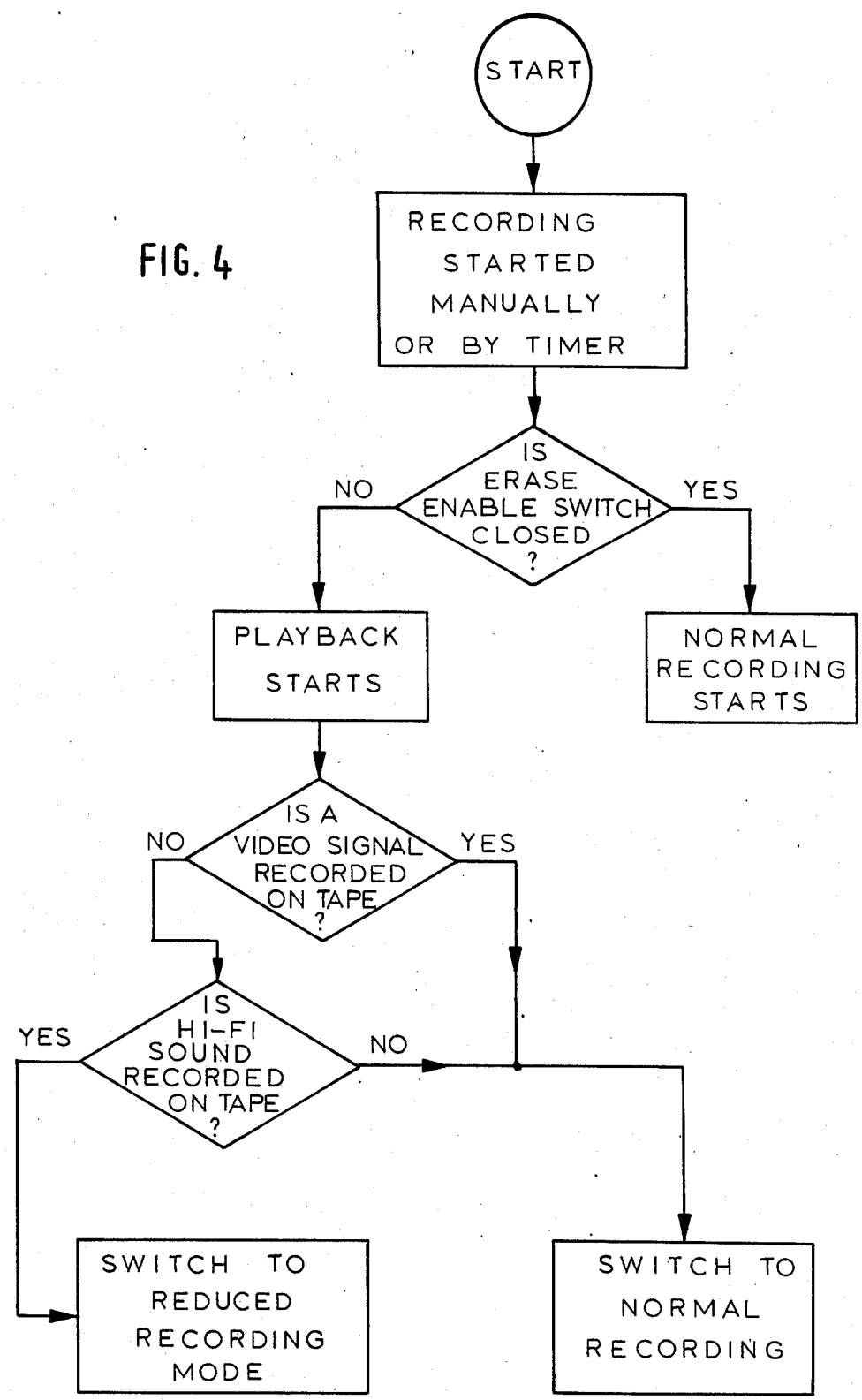
FIG. 4 is a flow diagram setting forth the sequence of method steps according to the invention.

The process of the invention is made clear step-by-step in the flow diagram of FIG. 4. It is assumed in FIG. 4 that a video cassette has been inserted in a Hi Fi video recorder which has been equipped in accordance with the invention.

FIG. 4 indicates in the rectangle below the "start" circle that the recording mode, having been selected, is put into operation either manually or by an automatic timer. The next step is to determine whether the erase head enable switch 58 (FIG. 5) is closed. If so, that indicates that the user desires to erase anything that might be on the tape and, as a result, the Hi Fi video recorder operates in the normal way, i.e., it starts to record a television signal.

If the erase enabling switch 58 is not closed, an automatic mode changeover switch 60 (FIG. 5) is activated in such a way that in spite of the initially selected recording operation, the Hi Fi video recorder is temporarily put into playback operation for a certain interval. Identification of the state of the video tape inserted in the recorder then takes place in the playback mode.

It is first determined whether a video signal has already been recorded in the video band. A binary video signal detector 48 within the identification circuit 46 detects any video signal present. If this test leads to the result that there is a video signal on the tape, that signifies that the tape cannot satisfactorily be used for a further recording of television without erasing. In consequence, the detection of a video signal on the tape is used to cause the automatic mode changeover switch 60 to switch back into the normal recording mode, so that from this point on the Hi Fi video recorder records in the usual way. The switch 58, therefore, rather than indicate whether the user desires to erase the tape, is really a manual override of the steps that have just been described: in other words, when the switch 58 is closed, the user has indicated a desire to skip the identification stage and record with erasing no matter what might be on the tape. Provision of such a switch is of course not necessary for the practice of the invention.

Figure 5:
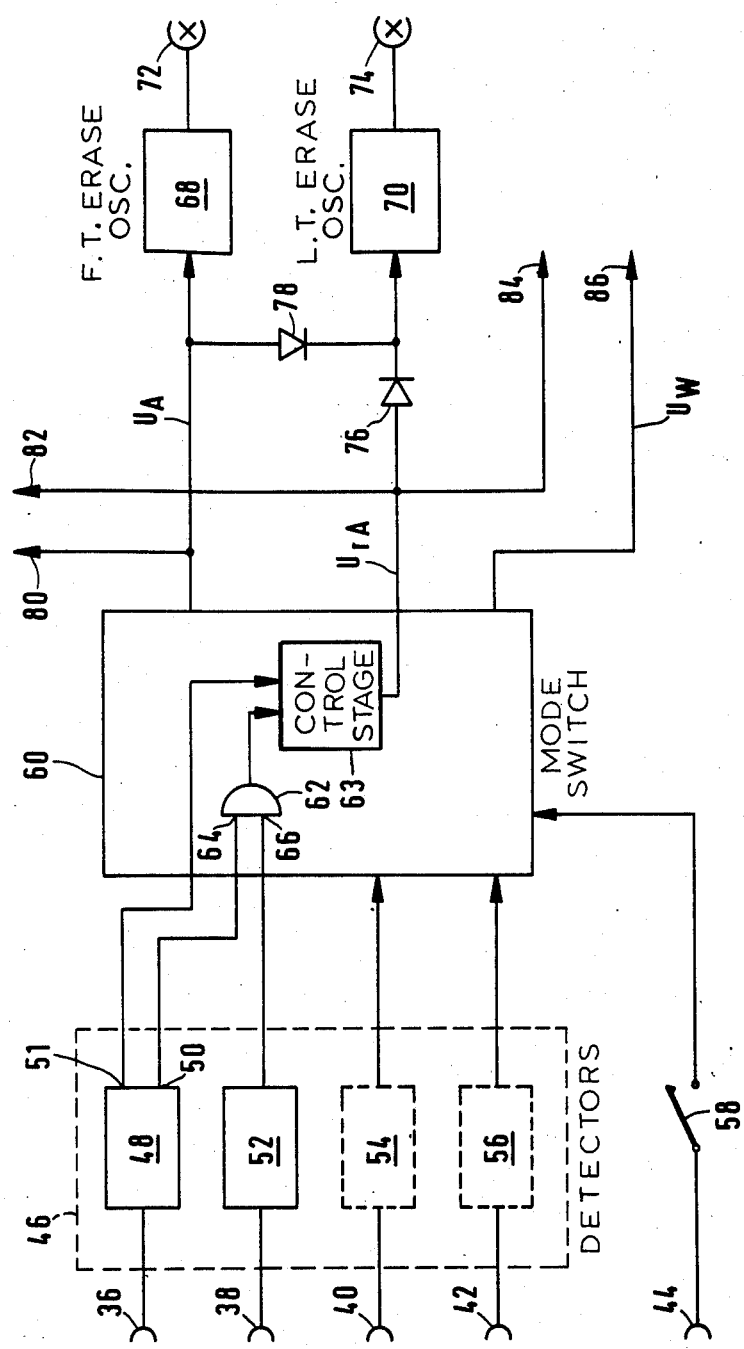
FIG. 5 is a block circuit diagram of a combination of apparatus forming part of a video recorder, for the practice of the invention.

If the video signal detector 48 does not detect any video signal on the tape, the identification circuit proceeds with a further test which determines whether control signals 18 are present on the control track 16, this being performed by the circuit 52 of FIG. 5.

As an alternative to the circuit 52 or as a supplementary check regarding the presence of a Hi Fi sound recording, the circuit of FIG. 5 also ties in the FM sound carrier detector 54 that is normally in a Hi Fi video recorder to indicate the presence of Hi Fi sound on the tape.

A control signal detector 56 is provided for detection of a supplementary control signal that might possibly have been recorded on the longitudinal track 14 in order to identify the tape as one on which only sound was recorded in spite of the tape being an ordinary video tape. The terminal 42 of FIG. 5 is accordingly connected to the output of the longitudinal track sound head. The use of such a supplementary control signal and its evaluation by the control signal detector 56 have the advantage that evaluation is possible, even when the tracking control is off-center, so that the recognition of a sound recording can be made without the possible unreliability of dependence upon the presence of the FM sound carriers 18 and 20.

When it has been determined by the control signal detector 52 and/or the detector 54 and/or the detector 56 that there is no FM sound carrier on the video tape, the automatic mode changeover switch 60 switches the video recorder into the normal recording mode.

In the case, however, that an FM sound carrier is present on the video tape, which means that the inserted video cassette is one on which an audio-frequency sound signal has already been recorded in the oblique tracks, the automatic mode switch 60 switches the video recorder into the "reduced recording" mode.

What particularly distinguishes the reduced recording mode is, among other things, that the full track erase head 72 of FIG. 5 is not enabled as it would be in normal recording. In consequence, the audio-frequency signals are retained on the oblique tracks of the video tape. The video signal is then likewise recorded on the oblique tracks by the normal operation of the recording heads, while the sound signal contained in the composite television signal to be recorded is recorded on the longitudinal track 14 in the "reduced recording" mode of the video recorder.

A further particularlity of the reduced recording mode is that the control signals 18 of the control track 16 are read and processed for control of synchronization of tape advance in exactly the same way as would be done in a Hi Fi video recorder during playback operation. In normal recording, on the other hand, new control signals 18 would be recorded on the control track 16 by vertical synchronizing pulses of the television signal.

It is thus possible by virtue of the present invention to record a television signal, even with its sound signal, supplementarily upon a tape in which audio-frequency sound signals have already been recorded on the oblique tracks of the tape without loss of the availability of those previously recorded sound signals for future playback. This result constitutes a more complete use of the recording capabilities of the video tape.

The steps of the method of the invention are so selected that nothing is changed for normal recording of a television signal on a tape on which there has been no recording at all, because the identification circuit 46 checks the inserted tape in every case before the beginning of the actual recording and only switches over to reduced recording when an audio-frequency sound program which ought to be preserved is already on the tape. If the user wants to erase a previously recorded sound program to replace it with another exclusively sound program, he can use the manual override switch 58.

It is not absolutely necessary that the sound recording should be a stereo signal, even though the two FM sound carriers 22 and 24 make it easy to record stereo sound signals. The sound recording first made could also be a monophonic sound recording recorded with one of the sound carriers on the oblique tracks in order to obtain high fidelity, or there could be two monophonic sound signals for playback either together or one at a time.

The identification of the state of a video tape inserted in a Hi Fi recorder in accordance with the invention and a consequent mode switching operation ending either in normal recording or reduced recording, can be accomplished in a relatively short time, for example 2 to 3 seconds, so that no appreciable disadvantages are provided for the user who does not often make use of the possibilities offered by the invention of providing two playable recordings on the same video cassette. Besides, the ordinary user is already used to the known video recorders which are a short period of time passes after activation of the recording button to take care of the feeding in of the video tape before the actual recording function starts. These conventional steps, such as feed-in, checking of the recording preventer, etc., have been left out of the flow diagram of FIG. 4 in order to simplify the explanation of the steps of the present invention.

FIG. 5, already referred to incidentally in connection with some of the variations of the steps of the method of the invention, is a block circuit diagram of a portion of a Hi Fi video recorder embodying the equipment necessary for carrying out the method of the invention, which will now be described.

After putting the machine in the recording mode, either manually or through a timer, the Hi Fi video recorder is first forced into the playback mode by the automatic mode switch 60 for a few seconds, in order to identify the state of the video tape 10. In the playback mode, which in this case is used as a recognition mode, a signal is produced from a video readout amplifier not shown in the drawing, which provides its output to a terminal 36 shown in FIG. 5, which is furnished to the binary video signal detector 48 that has both a normal output 51 and an inverted output 50. The latter is connected with one input 64 of an AND-gate 62 while the normal output 51 of the binary video signal detector 48 is supplied to a control stage 63. The output of the AND-gate 62 is likewise connected to the control stage 63.

The identification circuit 46 also comprises a control signal detector 52 to which is supplied through an electrical terminal 38 the output of a control signal amplifier not shown in the drawing, which amplifies the output of a control track 10. The signal at the terminal 38 accordingly indicates whether there are control signals 18 on the control track 16. The output of the control signal detector 52 is connected with a second input 66 of the AND-gate 62.

It may now be assumed, for purposes of illustration, that nothing more than a sound signal appears in the oblique tracks of the video tape 10 that have been inserted in the video recorder. Because of the resulting absence of video signals, a binary signal appears at the inverting output 50 of the video detector 48, whereas no signal is provided at the normal output 51 of the video detector. Furthermore, the control signal detector 52, in response to the presence of control signals 18, provides an output signal to the input 66 of the AND-gate 62. The AND conditions of the gate 62 are now satisfied, with the result that a signal is provided to the control stage 63, in consequence of which the automatic mode changeover switch 60 now switches the video recorder into the "reduced recording" mode. In this particular mode, the full track erasing oscillator 68 is disabled, i.e., the full track erase head 72 is not activated. In the above description, the control signal detector 52 is responsible for the determination of the presence of an audio-frequency sound signal on the video tape. This recognition can also be provided, as already mentioned, by the sound signal detector 54 over the terminal 40, in which case the output of the detector 54 would go to the input 66 of the AND-gate 62. In all cases of detecting the presence of an existing sound recording on the oblique tracks, a switching voltage $U_A$ results for producing the reduced recording mode of operation.

The arrows 80, 82, 84 and 86 of FIG. 5 indicate that the mode changeover switch 60 also produces other switching voltages for controlling the Hi Fi video recorder which are of no particular significance with regard to the explanation of the present invention. It is sufficient to mention that the arrow 86 designates a switching voltage $U_W$ by which the playback mode of operation is established.

A switching voltage $U_A$ for establishing normal recording is provided, when that mode is in effect, to the full track erase oscillator 68 which of course must be fully effective in normal recording. The already mentioned switching voltage $U_{rA}$ for reduced recording is furnished through a diode 76 to the longitudinal track erase oscillator 70. The inputs of the full track erase oscillator 68 and of the longitudinal track erase oscillator 70 are connected together by a diode 78, so that the switching voltage $U_A$ can also reach the longitudinal track erase oscillator 70 in order to activate the longitudinal track 74. The automatic mode changeover switch 60, including the illustrated AND-gate 62 and the control stage 63, can be constituted as a microprocessor having logic for providing the various switching voltages required for the establishment of the different modes of operation and for the manner of functioning of the Hi Fi video recorder in a manner dependent on control by the identification circuit 46.

The circuit of FIG. 5 also includes the erase enable switch 58 for selectively applying a voltage provided at an electrical connection point 44. When the switch 58 is closed, this voltage is supplied to the mode changeover switch 60, with the result that the identification steps described in the flow diagram of FIG. 4 are not carried out when the Hi Fi video recorder goes immediately into normal recording. The user can thus close the switch 58 in order to erase the sound recording already present on the particular video tape. In the mode of operation essential to the present invention, above referred to as "reduced recording", neither the full-track erase head 72 nor the FM sound heads receive any signal, in order that the oblique track sound recording already present will be neither erased nor impaired. It is naturally also possible that during this recording the FM sound heads and the read-out amplifiers to which they are connected may be switched to playback operation and that the signal of the sound recording present on the oblique tracks could be made available at the audio signal output terminals of the video recorder. Color streaks such as occur in the insert editing procedure already mentioned, so not appear in the practice of the present invention, because on the video tape 10 which bears previously recorded Hi Fi sound signals, no color carrier signal has yet been recorded.

The playback of a video tape 10 on which recording both of separate sound and television programs have been recorded in accordance with the invention involves no difficulties or complications. The video signal 34, as well as the sound signal of the longitudinal track 14, are reproducible by a television set connected to the playback outputs of the video recorder, while the sound recorded on the oblique tracks can be supplied to the normal audio-frequency outputs of the Hi Fi video recorder, to which a conventional Hi Fi sound system with amplifiers, speakers, crossover controls, etc., may be connected.

Although the invention has been described with reference to a particular illustrative example, it will be understood that modifications and variations are possible within the inventive concept.

The full track erase head normally erases the synchronizing track as well as the oblique tracks. Of course, a separate erase head for the synchronizing track could be controlled simultaneously with an erase head for the oblique tracks to reach the same result.

I claim:

1. Method of recording a composite television signal on a Hi Fi video recorder which is equipped not only with video heads, a synchronizing head and a longitudinal-track sound head, but also with oblique-track sound heads and comprises also a full-track erase head, a video detector and means for interposing operation in playback mode before beginning recording for synchronizing sources of video signals to be recorded before actual recording thereof, said method including, during passage of a tape of a video cassette through said video recorder, the steps of:

interposing operation in playback mode, including normal operation of said synchronizing head and synchronizing circuits responsive thereto as well as normal operation of said oblique-track sound heads, for an interval preceding recording, for observing the output of said video detector;

detecting during said interval whether or not sound carrier signals are reproduced by said oblique-track sound heads, and in the event of no detection of a video signal and detection of a sound carrier signal, disabling said oblique track sound heads and said full-track erase head not later than the end of said interval, when return to a recording mode occurs, and also thereafter blocking the recording of new synchronizing signals while maintaining the normal operation of said synchronizing head and synchronizing circuits responsive thereto in the same manner as in the playback mode, for thereafter recording video signals without rendering unusable the underlying sound signals, on oblique-tracks on said tape.

2. Method of recording a composite television signal on a Hi Fi video recorder which is equipped not only with video heads, a synchronizing head and a longitudinal-track sound head, but also with oblique-track sound heads and comprises also a full-track erase head, a video detector and means for interposing operation in playback mode before beginning recording for synchronizing sources of video signals to be recorded before actual recording thereof, said method including, during passage of a tape of a video cassette through said video recorder, the steps of:

interposing operation in playback mode, including normal operation of said synchronizing head and synchronizing circuits responsive thereto as well as normal operation of said oblique track sound heads, for an interval preceding recording, for observing the output of said video detector;

during said interval detecting whether or not synchronizing signals are reproduced by said synchronizing head, and in the event of no detection of a video signal and detection of synchronizing signals, disabling said oblique track sound heads and said full track erase head not later than the end of said interval, when returning to a recording mode occurs, and also thereafter blocking the recording of new synchronizing signals while maintaining the normal operation of said synchronizing head and of synchronizing circuits responsive thereto in the same manner as in the playback mode, for thereafter recording video signals without rendering unusable the underlying sound signals, on oblique-tracks on said tape.

3. Video recorder comprising video heads, having video writing and reading amplifiers connected thereto, at least one oblique-track audio head having writing and reading amplifiers connected thereto, a longitudinal-track sound head having writing and reading amplifiers connected thereto, a control-track head having writing and reading amplifiers connected thereto, tape transport means including means for tape advance control responsive to the output of the reading amplifier connected to said control-track head, a full-track erase head and a longitudinal-track erase head, an automatic mode changeover switch and means for operating said mode changeover automatically before the beginning of operation in a recording mode to interpose a prior interval of playback mode operation, and further comprising:

detecting means operable during said interval for providing an output whenever a sound recording is present on the oblique tracks of a portion of said tape in the neighborhood of said heads;

means for blocking the operation of said at least one oblique-track head and of said full-track erase head, and for blocking the furnishing of recording signals to said control-track head, during a recording mode operation of said recorder following said interval, and means for maintaining control of said tape transport means by said means for tape advance control during said recording mode operation following said interval.

4. Video recorder according to claim 3, in which said detecting means include a binary video signal detector (48) responsive to said reading amplifiers connected to said video heads, said video signal detector having both a normal (51) and an inverted (50) output and a control signal detector (52) responsive to the output of said reading amplifier connected to said control-track head, and in which said means for blocking the operation of said at least one oblique-track sound head and of said full-track erase head and said means for maintaining control of said tape transport means comprise as equipment common to said blockable and maintaining means, an AND-gate (62) having inputs respectively connected to said inverting output of said video signal detector and the output of said control signal detector and a control stage (63) for controlling said automatic mode changeover switch.

5. Video recorder according to claim 3, in which said detecting means includes an oblique-track sound carrier signal detector connected to said reading amplifier which is connected to said at least one oblique track audio head.

6. Video recorder according to claim 3, in which said detecting means include a mode identification signal detector (56) connected to the output of said reading amplifier connected to said longitudinal-track sound head.

7. Video recorder according to claim 3, in which said automatic mode changeover switch is supplemented by a manual override switch (58) for nullification of said interval and immediate establishment of a normal television signal recording mode of said video recorder in which said full-track erase head is activated.

* * * * *